United States Patent

Borison et al.

[11] 3,938,090
[45] Feb. 10, 1976

[54] TERMINAL APPARATUS

[75] Inventors: Victor Scott Borison, Middletown; Hans George Mattes, Ocean Township, Monmouth County; Colonel Blake McDowell, III, Holmdel; George William Schramm, Oakhurst; Gerald Steven Soloway, Morganville; John William Wesner, Jr., Freehold, all of N.J.

[73] Assignee: Bell Telephone Laboratories, Incorporated, Murray Hill, N.J.

[22] Filed: Feb. 13, 1975

[21] Appl. No.: 549,472

[52] U.S. Cl. .......................... 340/149 A; 179/2 CA
[51] Int. Cl.² .. G06F 3/04; H04M 11/06; H04Q 9/00
[58] Field of Search .................. 340/152 R, 149 A; 179/2 DP, 2 CA; 235/61.7 B

[56] References Cited
UNITED STATES PATENTS

| | | | |
|---|---|---|---|
| 3,571,799 | 3/1971 | Coker, Jr. ....................... | 340/152 R |
| 3,594,727 | 7/1971 | Braun............................. | 340/152 R |
| 3,686,637 | 8/1972 | Zachar et al..................... | 340/172.5 |
| 3,723,655 | 3/1972 | Zucker et al. .................... | 179/2 DP |
| 3,845,277 | 10/1974 | Yoss et al. ................... | 340/149 A X |

*Primary Examiner*—Donald J. Yusko
*Attorney, Agent, or Firm*—A. D. Hooper

[57] ABSTRACT

A business transaction terminal for a credit authorization system or the like includes a microprocessor for receiving data from a magnetic card reader and a keyboard, automatically processing such data and transmitting it to a central data base for authorization of a proposed business transaction. The terminal receives back a response from the central data base which directs subsequent actions by the terminal user. Options are provided for receiving the response in a number of ways such as audible response, visual indicators and numeric displays. Options also permit the terminal to be operated in a hands free mode.

30 Claims, 12 Drawing Figures

CENTRAL PROCESSING UNIT

READ/ONLY MEMORY

FSK RECEIVER

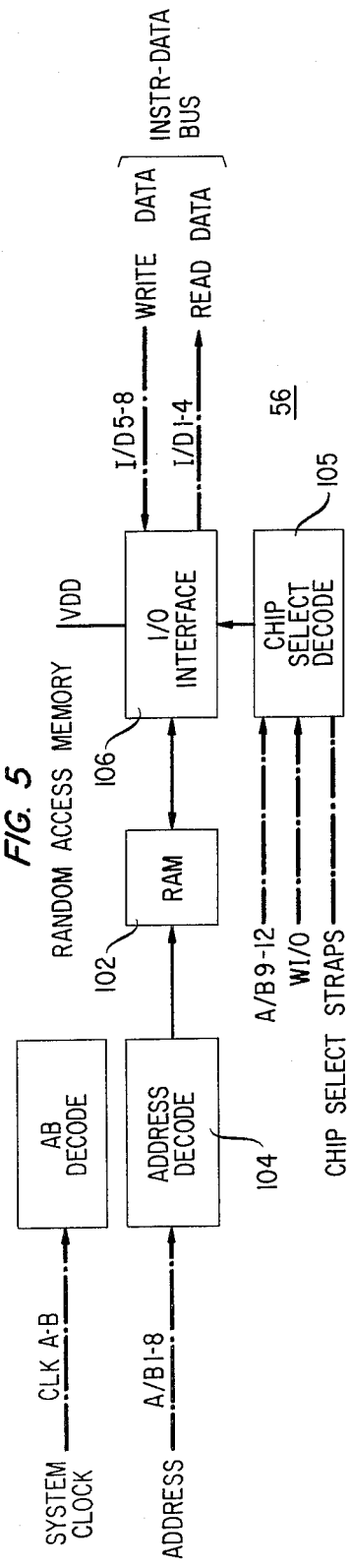
FIG. 5 RANDOM ACCESS MEMORY
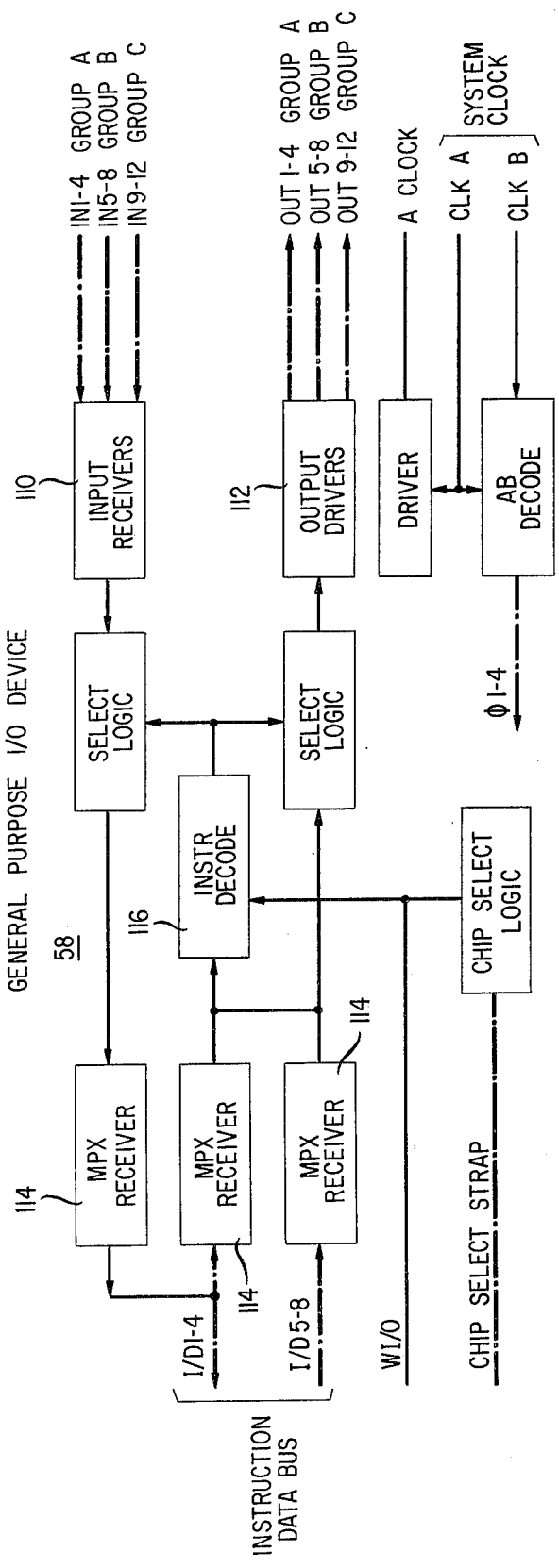
FIG. 6 GENERAL PURPOSE I/O DEVICE

CARD READER

TERMINAL APPARATUS

BACKGROUND OF THE INVENTION

1. Field of the Invention

This invention relates to business transaction terminals and more particularly to a terminal for collecting data regarding credit sales and like transactions, transmitting such data to a central location for authorization of the proposed transaction and receiving a response from the central location.

2. Description of the Prior Art

The widespread distribution of credit cards requires some control over their use to prevent fraudulent uses such as the use of stolen and expired cards or the use for purchases above authorized credit limits. In the past, most controls over credit card use have been primarily manual checks such as paging through a listing of unauthorized cards or manually calling a central location to obtain credit authorization or verification. Such manual controls are very slow and result in excessive cost to the merchant and inconvenience to the customer.

Recently many credit authorization systems and associated terminals have proposed for automating the credit authorization procedure. Such systems in general comprise data collecting terminals at points of sale which communicate via telephone lines with a central data location or base. Data related to a proposed credit sale or other transaction is entered into the terminal and transmitted to the central location for processing. A reply such as credit approval is then sent from the central location back to the point of sale terminal for completion of the transaction. Many of the proposed terminals have various disadvantages such as requiring complex driving mechanisms for moving the credit card through a reader at a constant reading speed.

Accordingly, it is an object of this invention to provide an improved terminal for credit authorization and like systems.

SUMMARY OF THE INVENTION

The foregoing object and others are achieved in accordance with this invention by a terminal for credit authorization and similar systems which includes a rate adaptive nonsynchronous card reader for reading credit data such as an account number on a magnetic stripe of cards which are rapidly moved by hand through the reader. The terminal includes a keyboard through which data such as the amount of a proposed credit sale can be entered. Data from the card reader and keyboard are buffered or stored in a read/write memory in the terminal to be transmitted to a central data location for processing when communication is established therewith. Such communication is automatically established by appropriate dialing circuitry while data is simultaneously entered from the keyboard. Instructions for operating the terminal are stored in a read-only memory and are used to control instruction lights which direct the terminal user through the proper operating sequence. The terminal receives from the central location an audible response to indicate, for example, either approval or disapproval of the proposed transaction. Various options can be added to the terminal such as visual indicators and a numeric display for visually displaying the response from the central data location. A sounder used with appropriate control keys can also permit hands-free operation of the terminal.

DESCRIPTION OF THE DRAWING

The invention will be more fully comprehended from the following detailed description and accompanying drawing in which:

FIG. 5 is a detailed block diagram of the random access or read/write memory shown in FIGS. 2A–2E;

FIG. 6 is a detailed block diagram of the general purpose input-output unit shown in FIGS. 2A–2E;

GENERAL PHYSICAL DESCRIPTION

Figure 1:
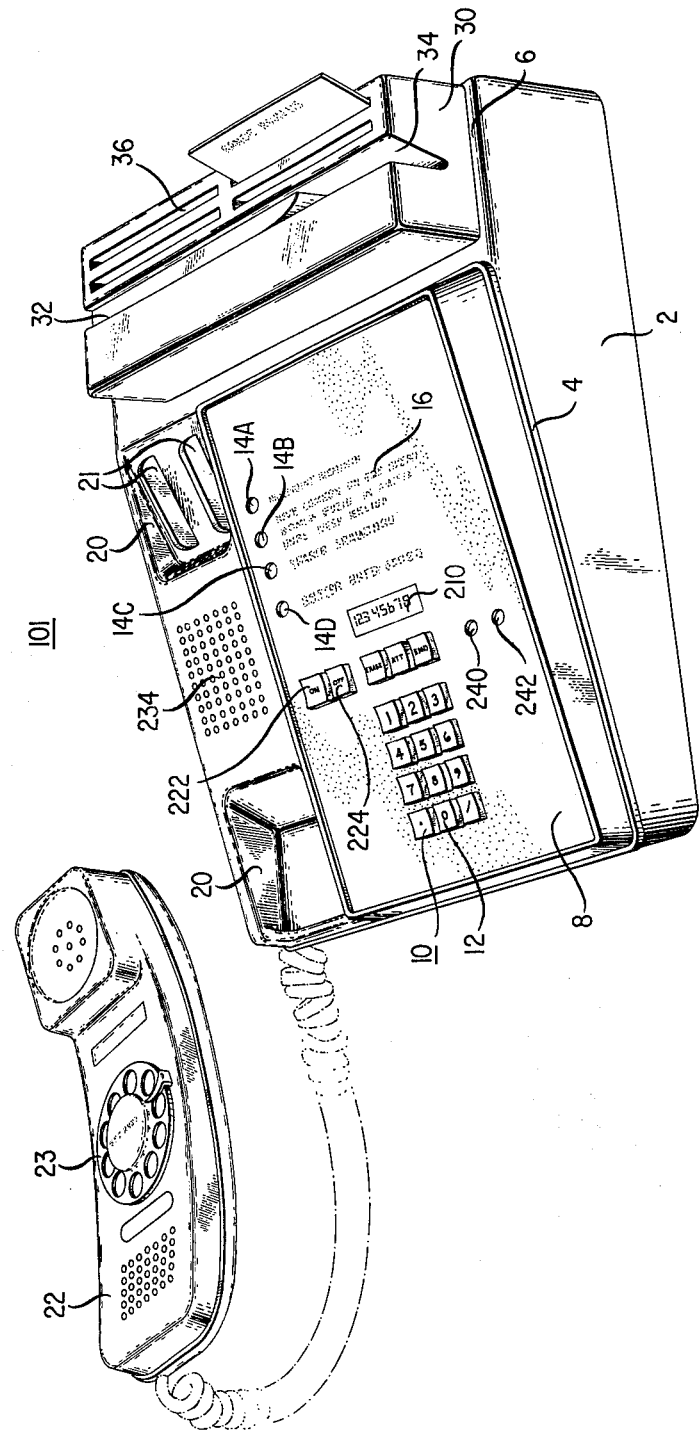
FIG. 1 is a perspective view of a business transaction terminal in accordance with this invention.
Figure 2E:
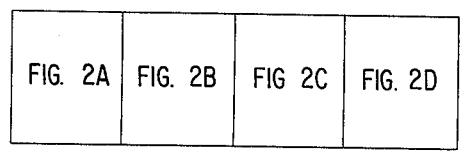
FIGS. 2A–2E comprise a schematic block diagram representation of the terminal of FIG. 1.
Figure 2A:
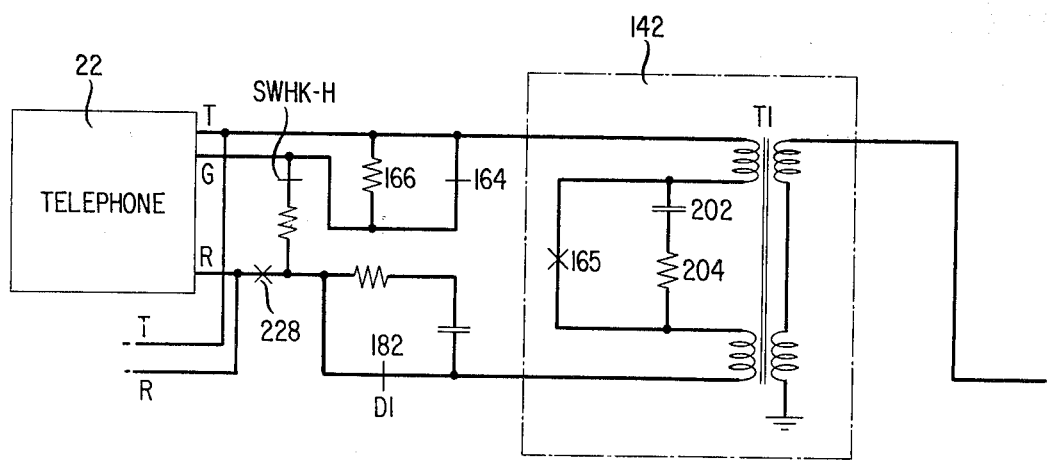
Figure 2B:
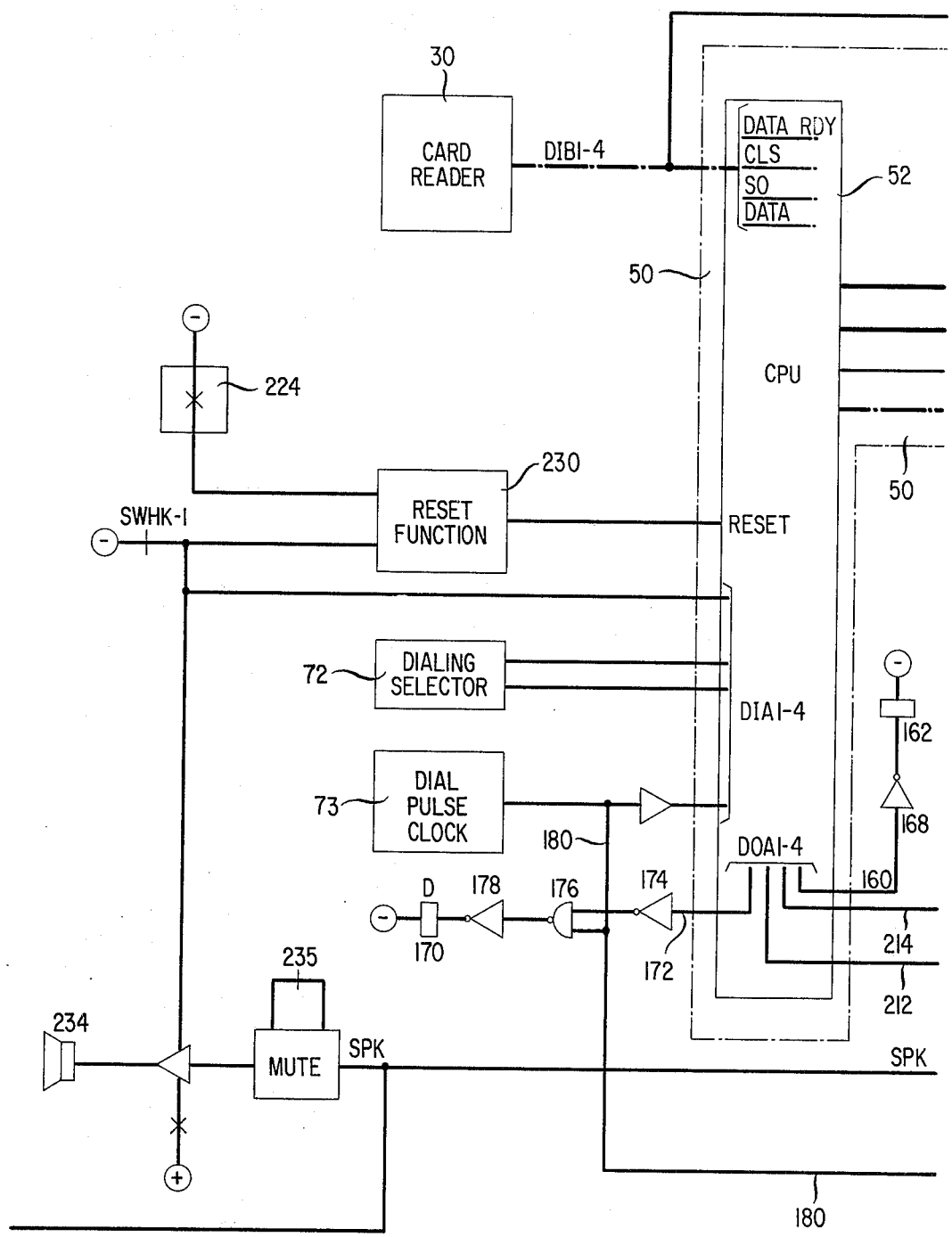
Figure 2C:
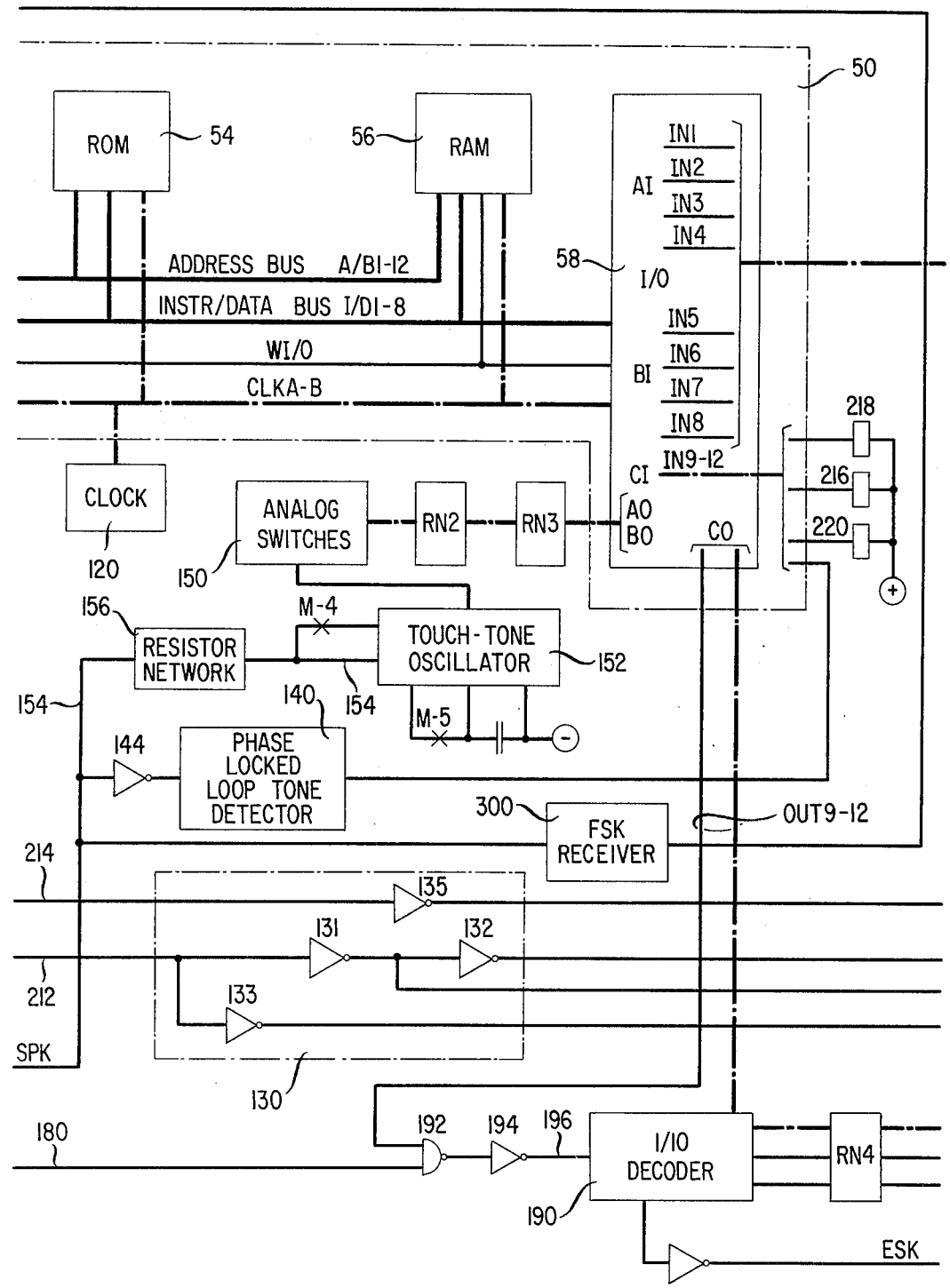
Figure 2D:
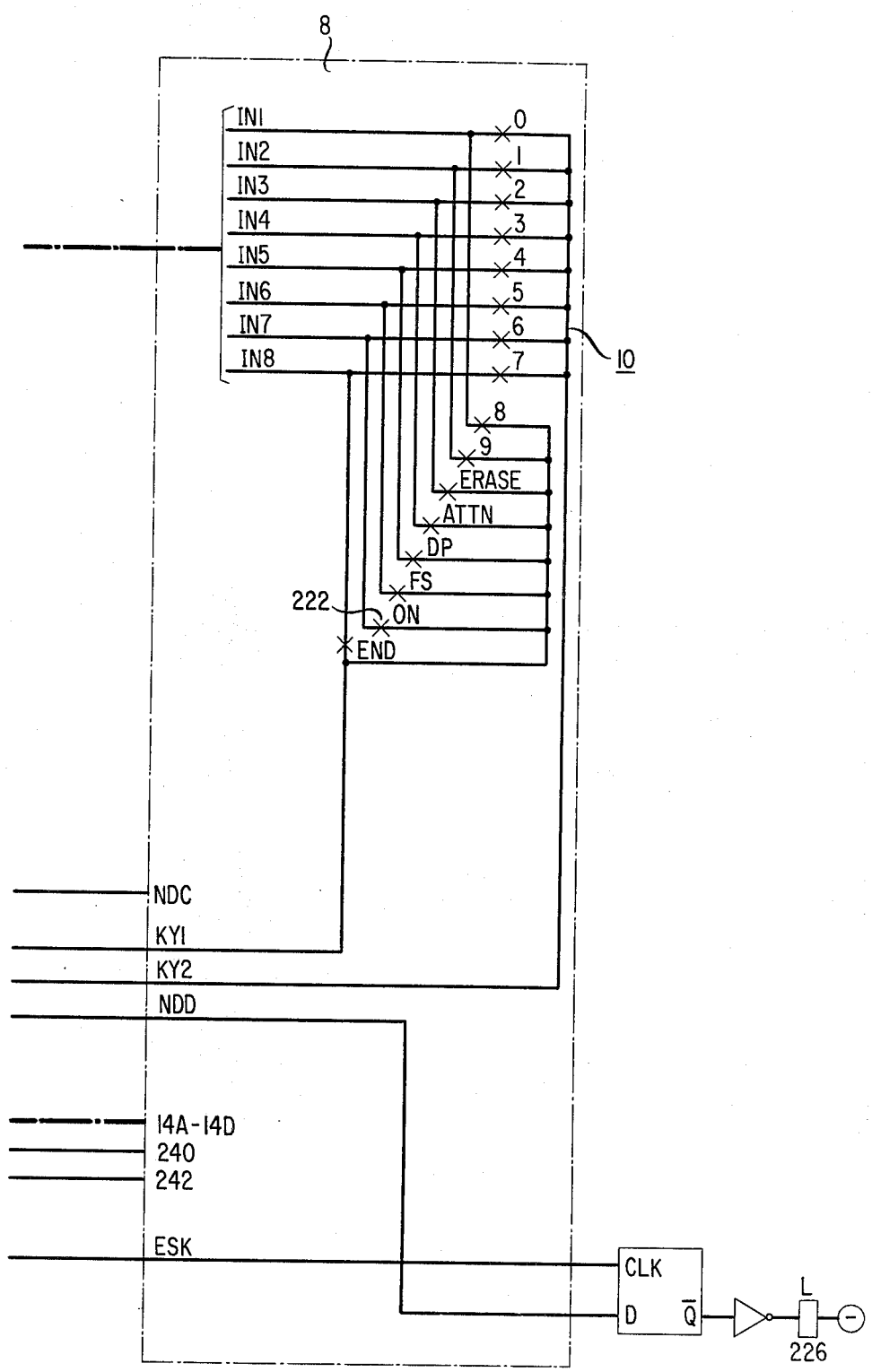

Referring now to FIG. 1 there is shown a business transaction terminal 101 for use at a remote location such as a department store or other point of sale in a credit authorization system. Terminal 101 includes a housing 2 having an inclined wedge shaped front section 4 which terminates in a substantially horizontal shelf or surface 6 at the rear. Mounted on inclined section 4 is a control panel 8 having thereon a data entry keyboard 10 comprising a plurality of pushbutton keys 12 and a plurality of indicators 14A–14D with accompanying printed instructions 16. Mounted in a cradle 20 with an appropriate switchhook 21 is a telephone 22 advantageously comprising a dial-in-handset hand telephone set such as available as a component of the telephone identified by the trademark TRIMLINE. Such a phone can have either a rotary or multifrequency pushbutton dial 23 as appropriate to the particular customer's type of service.

Mounted on shelf 6 of housing 2 is a card reader 30. Reader 30 is designed to read or decode information such as account numbers encoded on credit cards. For example, in an illustrative embodiment, reader 30 will decode or read information encoded in the magnetic stripe on a credit card. Reader 30 comprises in general one or more sensors or magnetic reading heads which respond to the passage of a magnetic stripe and logic circuitry responsive to the sensors for generating a binary bit stream representing the encoded information in the magnetic stripe. Reader 30 includes a slot 32 through which magnetic stripe cards to be read are rapidly moved by hand. Slot 32 includes a widened entrance portion 34 for guiding such cards into slot 32 into close proximity with the reading head or heads mounted therein. Reader 30 also includes storage slots 36 wherein magnetic stripe cards having merchang account numbers, telephone numbers, telephone numbers of central data locations and the like can be stored.

GENERAL DESCRIPTION OF OPERATIONS

The operation of terminal 101 in broad terms is as follows. A merchant may be a subscriber to various credit authorizations systems and would have a merchant card for each such system which would be stored in a slot 36. Such a merchant card would contain a telephone number for the central data base of the particular system, a merchant identification number, floor credit limits, and like information encoded in a magnetic stripe on the merchant card. The central data base of a particular system would of course contain up to date information on credit card holders of the system and means for handling inquiries for such information from merchants as is well known.

When a credit card holder presents his card containing his account number, etc., to a merchant for a credit purchase, the merchant lifts handset or phone 22 to obtain dial tone. When indicator 14A lights and dial tone is received, the merchant passes the appropriate merchant card through reader slot 32 with the magnetic stripe thereon properly oriented depending upon the particular design of reader 30. Indicator light 14B then instructs the merchant to pass the presented customer's card through reader slot 32 with the proper magnetic stripe orientation. A pause for a second dial tone before insertion of the customer card may be required in certain cases if a two-part telephone number is required for dialing the central data base as will be explained more fully subsequently. The customer's account number and like data can also be entered manually through keyboard 10. After entry of the customer data, the lighting of indicator 14C instructs the merchant to enter the amount of the proposed transaction, e.g., the value of the proposed credit sale, through keyboard 10. Terminal 101 automatically dials the central data base and transmits thereto the data previously entered upon receipt of an appropriate signal from the data base indicating that it is in operation. If the data base is not operational, indicator 14D lights and instructs the merchant to follow special instructions such as manually consulting unauthorized card lists. A partially operational data base can use information contained on the merchant card, such as floor limit, to initiate alternative action, such as the intervention of an attendant of the data base via the hand phone 22. If the central data base is operational, an answer concerning credit status of the customer is received over hand phone 22 and the merchant proceeds accordingly. As will be discussed more fully later, various options can be added to terminal 101 such as visual indicators responsive to the data base answers and a numeric display for displaying entered data or responses from the central data base.

DETAILED DESCRIPTION

Terminal 101 will now be described in detail with reference to the schematic block diagram of FIGS. 2A–2E and detailed diagrams in FIGS. 3 to 8. Terminal 101 includes a microprocessor 50 comprising a central processing unit (CPU) 52, a read-only memory (ROM) 54, a random access or read-write memory (RAM) 56 and a general purpose input-output unit (I/O) 58. Each of these elements 52, 54, 56 and 58 advantageously comprises a programmable metal oxide semiconductor large scale integrated (MOS/LSI) device. Such devices are commercially available. For example, devices commercially available from Rockwell Corporation as part numbers 10660, A5215, 10432 and 10696 can be used for elements 52, 54, 56 and 58, respectively, with the proper programming.

Figure 3:
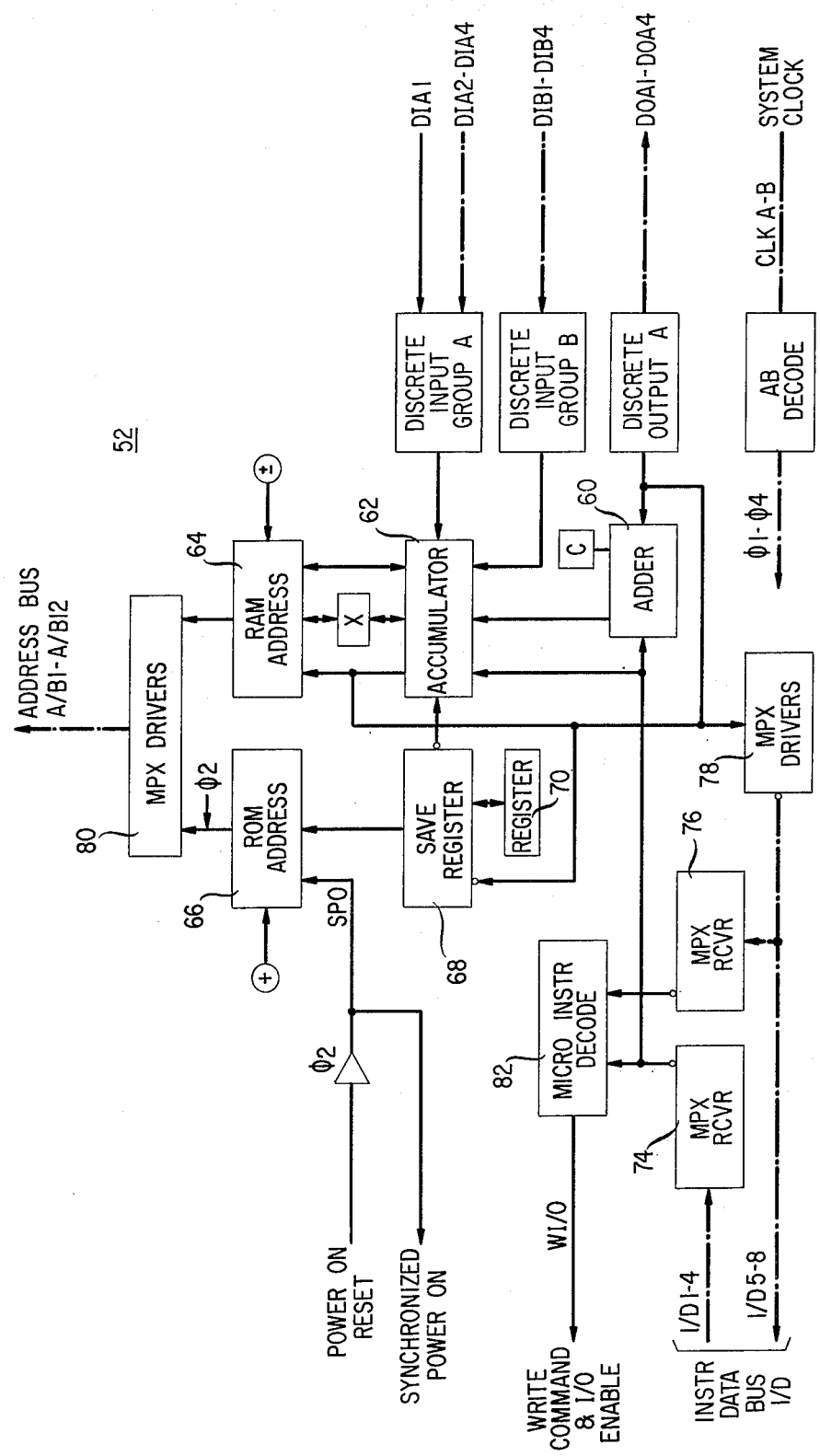
FIG. 3 is a detailed block diagram of the central processing unit shown in FIGS. 2A–2E.

As shown in more detail in FIG. 3, central processing unit (CPU) 52 includes a four-bit parallel adder 60 and an associated accumulator 62 for performing arithmetic and logic operations. A twelve-bit register 64 creates and stores addresses for the read-write memory (RAM) 56 and three twelve-bit registers 66, 68 and 70 create and store addresses for the read-only memory (ROM) 54. Unit 52 includes three inputs DIA2–DIA4, which are part of input group A, from a multifrequency/dial pulse selector 72 and associated clock 73 which selects whether initial addressing of the network by terminal 101 will be by multifrequency signaling or dial pulsing and the rate of such dial pulsing. CPU 52 also includes a switchhook signal DIA1 signifying when hand phone 22 is off hook. CPU 52 receives four inputs DIB1–DIB4, identified as discrete input group B, from reader 30. Input DIB4 is a switch closure signal signifying the presence of a card being read in reader 30. Inputs DIB1 and DIB2, respectively, are data and data clock signals from reader 30 derived from the magnetic stripe of the card being read. Input D1B3 is a spare lead input from reader 30 which provides flexibility for use of a different reader.

CPU 52 is interconnected with memories 54 and 56 and input-output unit 58 via an eight-bit instruction data bus containing leads I/D1–I/D8 which interface with appropriate multiplex receivers 74 and 76 and drivers 78 in CPU 52. CPU 52 is also interconnected with memories 54 and 56 by a twelve-bit parallel address bus containing leads A/B1 to A/B12 which are driven by multiplex drivers 80 in CPU 52. CPU 52 also includes a decoder 82 for decoding instructions received over instruction-data bus leads I/D1–ID8. This decoder 82 provides commands to memory 56 and I/O unit 58 over write-input/output connection WI/O.

Figure 4:
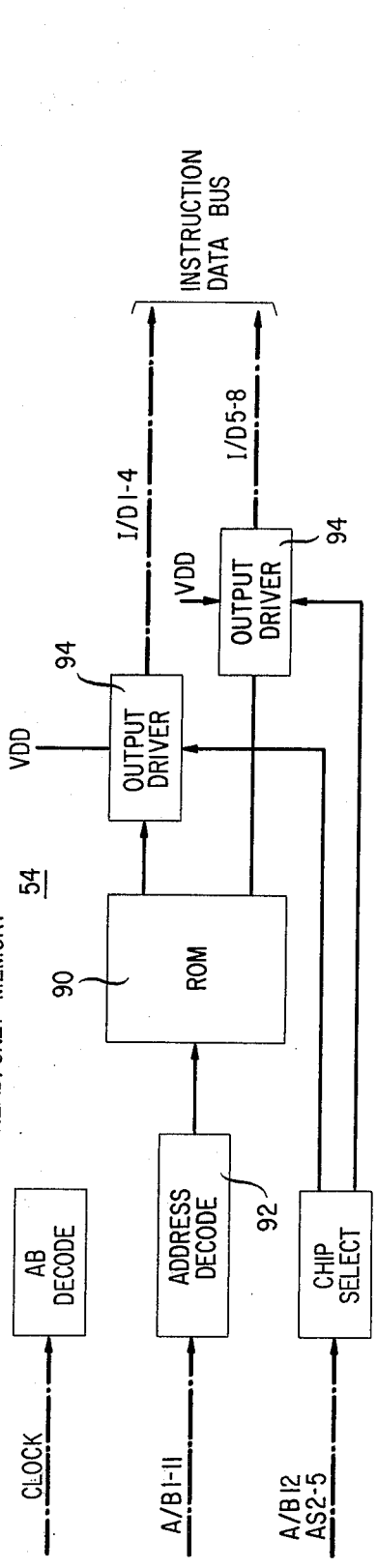
FIG. 4 is a detailed block diagram of the read only memory shown in FIGS. 2A–2E.

Read only memory (ROM) 54 shown in detail in FIG. 4 comprises a 16, 384-bit memory 90 organized in a 2048 × 8-bit configuration. The ROM 54 stores eight-bit microinstructions for control and sequencing of data within terminal 101. These instructions are stored by programming ROM 54 with a mask customized for a particular terminal design. Thus the logical operation of the entire terminal 101 can be changed by using a different mask to program ROM 54. ROM 54 includes an address decoder 92 for decoding addresses from CPU 52 received on leads A/B1–A/B11 and appropriate drivers 94 for driving the instruction signals placed on instruction-data bus leads I/D1–I/D8.

Random access or read-write memory (RAM) 56 is shown in detail in FIG. 5 and comprises a 1024-bit random access memory 102 organized in a 256 × 4-bit configuration. The RAM 56 also includes an address decoder 104, a chip decoder 105, and an input/output interface 106 for decoding and interfacing address and instruction bits on address bus leads A/B1–A/B8 and instruction-data bus leads I/D1–I/D8, respectively. RAM 56 is used for temporarily storing information used during the operation of terminal 101. For example, data from card reader 30 and keyboard 10 are stored or buffered in RAM 56 before being transmitted to the central data base.

General purpose input-output (I/O) 58, which is shown in detail in FIG. 6, extends the input-output capabilities of CPU 52 by providing 12 discrete inputs IN1–IN12 and 12 discrete outputs OUT1–OUT12 though receiver 110 and drivers 112, respectively. These inputs and outputs are connected with other portions of terminal 101 external to the microprocessor 50 as will become clearer subsequently. I/O 58 is commanded by an eight-bit instruction from ROM 54 on instruction-data bus leads I/D1–I/D8 and an enable signal from CPU 52 on bus or lead WI/O. Four bits of the eight-bit instruction are used for addressing I/O 58 and the remaining four bits define the operation to be performed. The eight-bit instruction is received by multiplexed receivers 114 and decoded by decoder 116. Data is transferred through I/O 58 from inputs IN1–IN8 to instruction data leads I/D1–I/D4 and from output OUT1–OUT12 to leads I/D5–I/D8, most significant to most significant and least significant to least significant bit.

The operation of microprocessor 50 is controlled and coordinated by a clock 120 such as is known in the prior art. A commercially available device which can be used for clock 120 is available from Rockwell Corporation as part number 10706.

As indicated earlier inputs IN1–IN12 to I/O 58 come from other portions of terminal 101. One such other portion which provides eight inputs, IN1–IN4 and IN-5–IN8 comprising input groups A and B, respectively to I/O 58 is keyboard 10. As is readily apparent from FIG. 1, there are more than eight keys 12 in keyboard 10, i.e., 15 in the illustrative keyboard. Thus the keyboard signals must be multiplexed so that only eight discrete inputs to I/O 58 are required to accommodate signals from all keys on keyboard 10. This multiplexing is accomplished under the control of CPU 52 by supplying power to only one of two groups of keys 12 on the keyboard 10 at a given time. Outputs DOA2 from CPU 52 on lead 212 is fed to transistor array 130 comprising drivers 131 and 132 which produce outputs on leads KY1 and KY2 having opposite values, i.e., when lead KY1 is high or on, lead KY2 is low or off and vice versa. Leads KY1 and KY2 are interconnected with keys 12 as shown in FIG. 2. For example, input IN1 to I/O unit 58 will be high if either lead KY1 is high and number "8" key is operated or if lead KY2 is high and number "0" key is operated. Thus the signals from operation of all keys 12 can be accommodated by eight inputs IN1–IN8 to I/O 58. The operation of a key 12 is encoded by microprocessor 50 as a four-bit binary word for storage or control.

Another input to I/O 58 is input IN12 from a tone detector 140. As indicated earlier, when terminal 101 initially contacts the central data base, a response is received back to indicate whether the central data base is operation or not prior to the transmission of any further data thereto. In the illustrative embodiment, a 2025-Hz answer tone of 1.5 seconds or 3 seconds duration is sent from the data base to the terminal 101 to indicate if the control data base is operational or not, respectively. This answer tone is coupled from the telephone line by transformer coupling 142 to an amplifier 144 and the amplified signal is then fed to detector 140. Detector 140 advantageously is a phase-locked-loop detector designed to effect locking on a tone in the vicinity of the answer tone frequency, e.g., 2025-Hz in the illustrative embodiment. The output of detector 140 upon locking on the answers tone is fed to I/O unit 58 as input IN12 where it is processed to determine the duration of the signal, i.e., whether 1.5 seconds or 3 seconds, to control further operation of terminal 101. Detector 140 can comprise a commercial device such as that available under part number NE567V from Signetics Corporation.

Inputs IN9–IN11 of I/O 58 determine the use of options available with terminal 101. This will be discussed in more detail subsequently.

Terminal 101 can use either multifrequency signaling or dial pulse signaling to dial all or any part of the telephone number of the central data base. However, multifrequency signaling is used for all data transmission between terminal 101 and the central data base.

When multifrequency signaling is being used, either for telephone number dialing or for data transmissions, the character to be transmitted is presented in dual 1/4 code, i.e., two out of eight code, at the group A and group B outputs, i.e., outputs OUT1–OUT4 and OUT-5–OUT8, respectively, of I/O unit 58. This character then passes through resistor networks RN2 and RN3, which change the voltage thereof to a level required at the input of analog switches 150. Switches 150 can comprise known field effect transistor switches. For example, devices available from RCA as part number CD–4066 can be utilized for switches 150.

Switches 150 select the proper inputs, i.e., the proper two voltage from the A and B outputs, for input to a multifrequency oscillator 152. Oscillator 152 can comprise a known multifrequency oscillator such as the hybrid integrated circuit oscillator used in the TOUCH-TONE telephone presently in use. Oscillator 152 generates the desired multifrequency tones or signaling on output 154 which is coupled to the transmission line through the previously mentioned coupler 142. The levels of the tones on output 154 are controlled by the selection of a particular resistor in resistor network 156.

During multifrequency signaling, and also during testing for the 2025-Hz answer tone from the central data base previously discussed, it is necessary to mute or isolate phone 22. This is accomplished by providing an output DOA3 from CPU 52 on lead 160 to operate mute relay 162. When relay 162 operates, contact 164 opens and inserts a resistor 166 in series with the phone 22 which effectively isolates the phone 22 from the remainder of terminal 101. The voltage level of the output from CPU 52 on lead 160 is converted to the proper level for operating relay 112 by an amplifier 168.

Dial pulse signaling for dialing part or all of the telephone number of the central data base previously mentioned is accomplished by activating dial pulse relay 170. An output DOA4 from CPU 52 on lead 172 is applied to dial pulse relay 170 through an inverter 174, NAND gate 176 and amplifier 178. A timing output from the multifrequency-dial pulse clock 73 is also connected via lead 180 to relay 170 through gate 176 and amplifier 178. The timing output from clock 73 and output from CPU 52 operate dial pulse relay 170 which opens and closes contact 182 in the transmission line the proper number of times to produce the desired number of dial pulses on the line.

The previously mentioned indicators 14A-14D on control panel 8 which sequence a user of terminal 101 through the correct operating procedure are light emitting diodes (LEDs) which are controlled by outputs OUT9-OUT12 from I/O 58. Three of these outputs OUT9-OUT11 carry a three-bit, binary-coded-decimal code which is fed to a one-out-of-ten decoder 190. Decoder 190 decodes these three inputs to select one of eight outputs, four of which comprise outputs to indicators 14A–14D and the others of which will be discussed subsequently with respect to available options. The fourth output OUT12 is fed to gate 192 where it is combined with the output from clock 73 on lead 180 and then fed to decoder 190 via gate 194 and lead 196. This input to decoder 190 is then used to blink or flash the indicators connected to the outputs of decoder 190 to indicate such things as an invalid card read which requires repeat of the indicated step in the terminal operating sequence. Decoder 190 includes drivers for driving the indicators connected to its outputs. The output current from decoder 190 can be limited by a resistor network RN4. Decoder 190 can comprise known apparatus such as a commercially commerically available from Fairchild as part number 9302.

As earlier indicated, terminal 101 is connected to telephone lines by a transformer coupling 142 comprising a transformer T1 and a capacitor 202 which blocks direct current from the line to transformer T1 so that when phone 22 is off hook the line sees only one main station. When phone 22 is muted as earlier discussed, contact 165 is operated by relay 162 to bypass capacitor 202 so that terminal 101 still draws current equivalent to one main station. Resistor 204 in series with capacitor 202 suppresses transients generated by contacts 165.

The dc power for operating terminal 101 is derived from a standard 110-volt ac line through a well known power supply comprising rectifiers. For example, a step down transformer provides an ac voltage to diode bridge rectifiers which provide dc outputs. These outputs are then regulated by regulators such as those available from Fairchild as part number 7805UC and 78N12UC or Motorola as part numbers 7805PC and MC-7912PC to provide regulated +5 volt and −12 volt sources, respectively. These voltages can be filtered by capacitors before distribution.

As indicated earlier, card reader 30 decodes the information in the magnetic stripes on merchant and customer cards and provides such information to microprocessor 50. Advantageously, reader 30 reads or decodes the information in the magnetic stripe substantially independent of reading speed variations. Readers suitable for such application are known in the prior art. For example, U.S. Pat. No. 3,737,632 issued to R. O. Barnes on June 5, 1973 discloses a single head rate adaptive nonsynchronous demodulator or reader which might be used for reader 30. Copending applications Ser. Nos. 494,030 and 494,031 both filed Aug. 2, 1974 by R. J. D'Orazio et al. and G. E. Moore, Jr., respectively, and both assigned to the assignee of this invention, disclose dual head code converters or readers which decode magnetic stripes independent of reading speed variations. Such dual head readers could also be used for reader 30.

Figure 7:
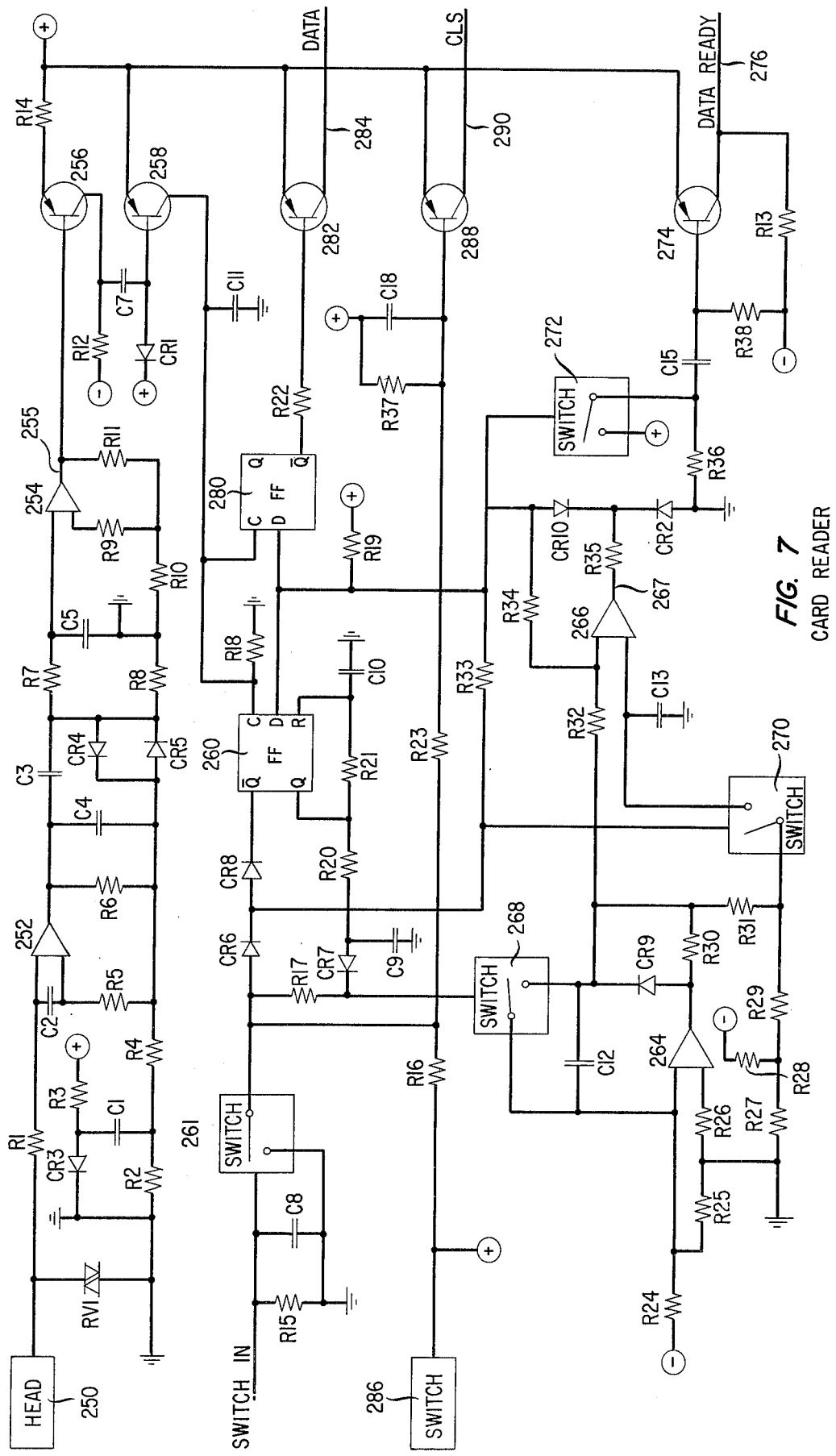
FIG. 7 is a detailed schematic of the card reader shown in FIGS. 2A–2E.

A schematic block diagram of still another magnetic stripe card reader which can be used for reader 30 is shown in FIG. 7. Signals read from a magnetic stripe by a reader head 250 are fed to an operational amplifier 252. Head 250 can comprise a commercially available device such as the credit card reading head available from Nortronics Co., Inc., as part number DQ11HO56R19. The amplified, filtered, integrated and limited output from amplifier 252 is applied to a second operational amplifier 254. The signal at the output 255 of amplifier 254 is a binary signal of two frequency coherent phase (bi-phase) encoding which combines serial data with clock information. If a transition occurs between clocks bits the data is a "one" end if no transition occurs the data is a "zero." Since the card is moved past head 250 by hand, its speed will vary and therefore bit length will vary along the signal stream at output 255. However the assumption that one bit edge transition will occur after three-fourths of the time required for the previous bit will allow for any reasonable variation in card speed while it is in reader 30. The signal at output 255 of amplifier 254 is applied to the base of a transistor 256 having its collector connected to the base of a second transistor 258. The output from the collector of transistor 258 is used to trigger a one-shot multivibrator 260 which provides outputs to time ramp generator 264 and comparator 266 through switches 268 and 270. Generator 264 and comparator can comprise operational amplifiers. The three-fourths value of the ramp generated by generator 264 when a card enters reader 30 to trip a switch 286 is stored by comparator 266 and compared with the subsequent ramp value to provide a data ready or data clock signal through switch 272 and transistor 274 at output 276 when the new ramp value exceeds the stored three-fourths value. This data ready or clock signal is transmitted to CPU 52 as the previously mentioned input DIB2.

The output from the collector of transistor 258 is also used to trigger a flip-flop 280 which also has an input the output 276 of comparator 266. The result is that when there is a transition or bit center pulse, flip-flop 280 through transistor 282 provides a logical "one" signal for the last one-half of the bit at output 284 which is transmitted to CPU 252 as the previously mentioned input DIB1.

When the previously mentioned switch 286 in reader 30 indicates the insertion of a card in reader 30, a signal on output 290 is generated by transistor 288 for transmission to CPU 52 as input DIB4. Switch 286 can comprise a commercially available switch such as that available from Cherry Electrical Products Corp. as part number E6197HD.

The foregoing describes a basic version of terminal 101 which will be satisfactory for many applications. However, as indicated, various options can be added to this basic terminal to provide a wider range of services. One such option is the provision of an auxiliary data entry keyboard or pad. Such a pad would be in parallel with the existing keyboard 10 and data would be entered in the same manner. Keyboard multiplexing and like features would be controlled in the same manner as previously discussed. Such an auxiliary keyboard might, for example, be desired where a customer is provided with a secret account or control number, which he memorizes, in addition to the normal credit card. The auxiliary data pad would permit such a customer to enter the secret number himself into terminal 101 at some location away from the observation of any other person such as a clerk or bank teller. The clerk or teller would enter the data from the card in the previously discussed manner.

Another option which can be provided with terminal 101 is a numeric display 210 shown in FIG. 1 which can display data keyed into terminal 101 by a user and data such as an authorization code received back from the central data base. For example, display 210 can comprise an eight-digit seven segment display with an associated eight-bit serial-in parallel-out shift register in which the parallel outputs are connected to the seven segments of display 210 and the decimal point. Two outputs from CPU 52 can control such a numeric display. The data line signal NDD for the display shown in FIGS. 2A–2E is the same output DOA2 on lead 212 from CPU 52 that is used to provide the previously discussed keyboard multiplex controls on leads KY1 and KY2. The output DOA2 is converted to the proper level by a transistor driver and associated resistors in transistor array 130 to provide the proper signal NDD. The clock signal NDC for the numeric display is derived from an output DOA1 from CPU 52 on lead 214 which is converted to the proper levels by a transistor driver 135 and associated resistors in transistor array 130. Display 210 can display data such as the amount of proposed credit sale which is keyed into keyboard 10. With the addition of a data receiver, data transmitted from the central data base such as an authorization code can also be displayed. Option switch 216 which provides an IN10 to I/O 5858 indicates whether or not a data receiver is in terminal 101 so that microprocessor can control the operation accordingly.

Figure 8:
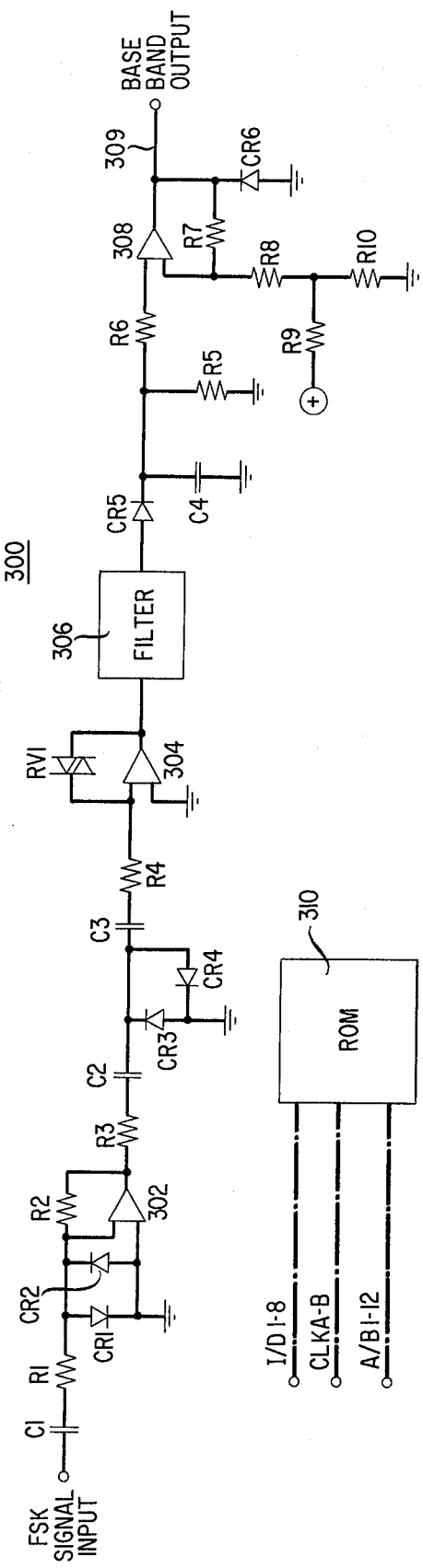
FIG. 8 is detailed schematic of a receiver for use in the terminal of the invention in conjunction with a numeric display.

A receiver 300 suitable for the foregoing application is illustrated in FIG. 8. Receiver 300 includes analog circuitry for demodulating a low-speed frequency-shift-keying (FSK) signal into a rectangular digital waveform. The analog input from the central data base is taken from the input terminal of amplifier 144 to detector 140 shown in FIGS. 2A–2E and fed to operational amplifier 302 where it is amplified and filtered. The output of amplifier 302 is further fed to operational amplifier 304 where it is limited and fed to a bandpass filter 306. The output of filter 306 is rectified and connected to a comparator 308, the squarewave baseband output 309 of which is fed to CPU 52 as an input on lead DIB3, the spare lead from card reader 30. Receiver 300 also includes a read-only memory 310 similar to the read-only memory 54 in microprocessor 50. Memory 310 is connected in parallel with memory 54 and stores the instructions required by microprocessor 50 for decoding the FSK digital signal on output 309 into characters. Memory 310 includes the instruction/data bus leads I/D1–I/D8 and the address leads A/B-1–A/B12 discussed with respect to ROM 54.

Terminal 101 also can be provided with a hands free mode of operation which permits use without moving phone 22. Control of a terminal 101 in the hands free mode is provided by ON key 222 and OFF key 224 which actuate a line switch relay 226 by a signal ESK from I/O 58 through decoder 190 and a signal on lead NDO from CPU 52 through transistor array 130. Relay 226 operates contacts 228 in the telephone line for connecting and disconnecting terminal 101 to the line as an alternative to the switchhook contact 21. ON key 222 is multiplexed with the keys 12 of keyboard as previously discussed. OFF key 224 is connected in parallel with the switchhook to reset signal generator 230 which initializes microprocessor 50 after the completion of each transaction with the central data base.

In the hands free mode, dialing of the central data station is accomplished on keyboard 10. Dialing from keyboard 10 is normally possible unless option switch 220 which provides an input IN11 to I/O 58 is set to prevent such dialing by lockout of keyboard 10. Option switch 220, as well as option switch 216 previously discussed and option switch 218, normally present a logic "one" voltage to their respective inputs IN11, IN10, and IN9 of I/O 58. These option switches can be changed to provide a logic "zero" voltage which correspondingly changes the operations of terminal 101 with respect to the particular option. Thus for hands free operation, option switch 220 is set to permit dialing from keyboard 10. To permit dialing from keyboard 10 the local ac power must be available as previously discussed. Dialing from hand phone 22 could be accomplished without the ac power as hand phone 22 services as a telephone main station powered from the line.

In the hands free mode of operation, a sounder 234 is added to terminal 101 to permit monitoring of the progress of calls to the central data base and to receive audible responses back from this base. Such a sounder 234 can be located for example, under hand phone 22 as illustrated in FIG. 1 or at any other desired location on housing 2. Such a sounder 234 can be driven by the output from oscillator 152 on lead 154 as indicated in FIGS. 2A–2E. Sounder 234 could also be controlled by line relay 226 so that it would only be operational in the hands free mode and would be muted via contacts 235 at other times by the operation of relay 162 including the time during testing for the 2025-Hz answer tone. The lifting of hand phone 22 resulting in the closing of switchhook contacts 21 would also disable sounder 234 to permit private communication with the central data base.

In the hands free mode the response from the central data base can be audible over sounder 234 as indicated above and can also be visual. As shown in FIG. 1, indicators 240 and 242 can provide a visual indication of data base response. For example, indicator 240 can comprise a green indicator which lights to signify credit approval. Indicator 242 can comprise an amber or yellow indicator which lights to signify credit disapproval or to inform the terminal attendant to take further steps such as lift phone 22 for further private instructions. Indicators 240 and 242 can be activated by appropriate tones from the central office such as a 2025 Hz tone of 1.5 seconds or 3 seconds duration, respectively. Such tones are not to be confused with the earlier discussed answer tones which are received upon initial contact with the central data base and which indicate whether or not the data base is in operation. The tone for operating indicators 240 and 242 occurs later in the operating sequence after the transmittal of all data from terminal 101 to the central data base. The tone for operating indicators 240 and 242 is also detected by detector 140 which provides an input IN12 to I/O unit 58. After appropriate processing, I/O unit 58 provides outputs OUT9–OUT11 to decoder 190 which are decoded to provide an appropriate signal for operating an appropriate one of indicators 240 or 242 in a manner similar to that previously discussed with respect to indicators 14A–14D. Option switch 218 must be set in the appropriate position as previously discussed to provide the visual response option through indicators 240 and 242.

SUMMARY OF OPERATION

To use terminal 101, hand phone 22 is lifted to obtain dial tone which is audible over the phone. In the hands free mode, the "on" button 222 is operated and dial tone is monitored over sounder 234. When instruction light 14A lights and dial tone is obtained, the user moves the merchant card through reader 30 to read in the telephone number of the central data base, the merchant account number and similar data. The inputs from the card reader 30 to microprocessor 50 include a card present signal, a data ready or data clock signal and the actual data. If the telephone number is a two-part number, as will be indicated in the coded card, i.e., includes an access code, the first part of the number is immediately dialed by appropriate outputs from microprocessor 50 to obtain the second dial tone required. Immediately after reception of the second dial tone, or immediately after completion of the reading of the merchant's card if a one-part telephone number is used, instruction light 14B directs the reading of the data on the customer card. After entry of the customer data the remainder of the two-part telephone number, or all of the single part number, is dialed by appropriate outputs from microprocessor 50. Telephone number dialing is accomplished by either dial pulsing or multifrequency signaling depending on the option selected by switch 72. Dial pulsing is accomplished by appropriate outputs from CPU 52 controlling dial pulse relay 170. Multifrequency signaling is accomplished by outputs from I/O Unit 58 controlling oscillator 152. The mode of dialing can be changed between the first and second parts of two-part numbers by proper coding of the merchant card. Both the merchant data, including the telephone number if the keyboard dialing option switch 220 so provides, and the customer data can be entered manually through keyboard 10. If the keyboard 10 cannot accept the telephone number because of the position of switch 220, dialing can still be done manually through handphone 22 and all other data can be entered through the keyboard 10. When a telephone number is entered manually, it is dialed out digit by digit as entered with any necessary buffering provided by microprocessor 50.

After entry of the customer data, instruction light 14C lights directing the entry of transaction data such as the amount of the proposed credit sale through the keyboard 10. This entry of data is accomplished simultaneously with the dialing of the telephone number of the central data base. Data portions within a particular data field, such as customer data, are separated by depressing the field separator key "/". Data fields are changed by depressing the key END which then sequences the next instruction light if data are being entered manually. When the key END is depressed when light 14C is on, appropriate "end of text" characters are generated by microprocessor 50 for transmittal to the central data base.

If incorrect entry of data is detected by microprocessor 50, an output triggers decoder 190 to cause the appropriate instruction light to blink to direct reentry of the data by rereading the card or by manually rekeying in the data. Manually entered data can be erased by depressing the key ERASE. Terminal 101 receives a response in the form of a tone from the central data base that it is operational which is detected by detector 140 and interrupted by microprocessor 50. Thereupon all data previously entered is transmitted to the data base and data entered subsequently is transmitted when the END key is depressed.

After all data is transmitted and processed by the central data base, terminal 101 receives a response indicating approval or disapproval of the proposed transaction. In the normal configuration, this response is received as an audible answer over hand phone 22. In the hands free mode, the response can also be an audible answer over sounder 234 and/or a visual indication through either indicator 240 or 242 responding to the appropriate tone as detected by detector 140 and interpreted by microprocessor 50 if the particular option is selected. The response, or part thereof such as an authorization code, can also be visually displayed on display 210 if this option is selected and an appropriate receiver has been provided.

If the central data base is not operational, a tone response is received by detector 140 and interpreted as such by microprocessor 50. In this case the data entered in terminal 101 is not transmitted to the central data base. Rather, microprocessor 50 triggers decoder 190 to activate light 14D which directs the user to follow special instructions. Terminal 101 can also be programmed in such a case to request an attendant. An attendant can also be requested at any time by operating the ATTN key.

After completion of a particular transaction, terminal 101 is disconnected from the central data base by replacement of hand phone 22 in its cradle or by the depression of the OFF key if terminal 101 is in a hands free mode.

The total amount of time required to complete a transaction with terminal 101 in its automated mode is a matter of a few seconds. This represents a substantial improvement over existing credit verification systems which require a substantial amount of manual data entry.

While the invention has been described with reference to a specific embodiment, various modifications can be made to terminal 101 without departing from the spirit and scope of the following claims.

What is claimed is:

1. Terminal apparatus for assembling data representing a proposed business transaction, for communicating said data to a remotely located central data base and for receiving responses from said central data base concerning said proposed transaction, comprising in combination:
    a magnetic stripe card reader for reading said data related to said proposed transaction coded on magnetic stripes;
    a keyboard for entering said data related to said transaction;
    a microprocessor for receiving and processing said data from said card reader and said keyboard and for producing outputs controlling said terminal apparatus;
    instruction lights operable in sequence for controlling the entry of said data into said terminal apparatus;
    a decoder responsive to first ones of said outputs for sequencing said lights;
    means responsive to second ones of said outputs for establishing a communications link with said central data base;
    detector means for detecting a first one of said responses from said central data base and providing a signal to said microprocessor representative of said first one of said responses;
    means responsive to third ones of said outputs subsequent to said detecting of said first one of said responses for applying said data to said communications link; and
    means receiving a second one of said responses for indicating subsequent steps in said proposed transactions.

2. Apparatus in accordance with claim 1 wherein said means responsive to said second ones of said outputs comprises signaling means for addressing said central data base with either dial pulse signaling or multifrequency signaling.

3. Apparatus in accordance with claim 2 including contacts operable for generating dial pulses and a relay responsive to certain said second ones of said outputs for operating said contacts; and a multifrequency oscillator responsive to other said second ones of said outputs for generating multifrequency signals, whereby said link can be established.

4. Apparatus in accordance with claim 1 wherein said first one of said responses comprises a tone; and said detector means comprises a phase-locked-loop detector for detecting said tone.

5. Apparatus in accordance with claim 1 wherein said means responsive to third ones of said outputs comprises a multifrequency oscillator for applying said data to said link by multifrequency signaling.

6. Apparatus in accordance with claim 1 wherein said second one of said responses comprises a voice response; and said means for receiving said second one of said responses comprises a telephone.

7. Apparatus in accordance with claim 1 wherein said second one of said responses comprises a voice response; and said means for receiving said second response comprises a sounder.

8. Apparatus in accordance with claim 1 wherein said second one of said responses comprises a frequency-shift-keyed signal; and said means for receiving said second response comprises;

a receiver for demodulating said signal into a rectangular digital waveform;

memory means for directing said microprocessor to decode said digital waveform into characters; and display means for displaying said characters.

9. Apparatus in accordance with claim 1 wherein said second response comprises a tone having a specified duration, and said microprocessor includes means for measuring said duration; and said means for receiving said second response comprises a plurality of visual indicators responsive to said outputs from said microprocessor, respective ones of said indicators being activated by said second response depending upon said duration of said tone.

10. Apparatus in accordance with claim 1 wherein said card reader comprises a rate adaptive reader for reading a binary signal of biphase-encoding having transitions and a nonuniform bit rate, said reader including;

switch means providing a first signal to said microprocessor indicating the presence of a magnetic stripe card in said reader;

first circuit means for extracting a clock signal from said biphase encoded binary signal and transmitting said clock signal to said microprocessor; and second circuit means for extracting a data signal from said biphase encoded binary signal and transmitting said data signal to said microprocessor, whereby said reader can read said data on cards which are manually moved through said reader at a variable speed.

11. Apparatus in accordance with claim 10 wherein said reader comprises:

a reading head for reading said magnetic stripe and generating said binary signal;

first and second operational amplifiers responsive to said head for amplifying said binary signal;

transistor means responsive to said operational amplifiers for producing a clock pulse for each said transition of said binary signal;

said first circuit means comprises a one-shot multivibrator responsive to said clock pulse to produce a timing signal, a ramp generator responsive to said timing signal for generating a ramp signal, a comparator responsive to said timing signal for storing a value equal to a fraction of a present ramp signal and comparing said value with a subsequent ramp signal, a switch and a first transistor responsive to said comparator for generating said clock signal; and said second circuit means comprises a flip-flop and a second transistor responsive to said clock pulse and said comparator for generating said data signal.

12. Apparatus in accordance with claim 1 wherein said keyboard comprises a first plurality of keys each of which is operable to produce a keyboard output;

a second plurality of input leads connecting said keys of said keyboard with said microprocessor, said second plurality being smaller than said first plurality; and means for multiplexing said keyboard outputs from said keys so that said keyboard outputs can be transmitted to said microprocessor on said second plurality of leads.

13. Apparatus in accordance with claim 12 wherein said multiplexing means comprises:

a first control lead interconnecting a first group of said keys;

a second control lead interconnecting the remainder of said keys; and a transistor array responsive to certain said outputs from said microprocessor for supplying power to one and only one of said control leads at any specific time, whereby said outputs from said first plurality of keys can be multiplexed onto said second plurality of leads.

14. Apparatus in accordance with claim 13 wherein said first plurality of keys comprises sixteen keys and said second plurality of leads comprises eight leads.

15. Apparatus in accordance with claim 1 wherein said microprocessor includes:

a read-only memory for storing microinstructions for controlling the operation of said terminal apparatus;

a random access memory providing storage of said data;

a central processing unit receiving said data from said reader and providing said outputs for controlling a first part of said means for establishing a communication link;

a general purpose input-output unit receiving data from said keyboard and said signal from said detector means, said input-output unit providing said outputs for controlling a second part of said means for establishing a communication link and for controlling said decoder;

data-instruction leads interconnecting said central processing unit, said read-only memory, said random access memory and said input-output unit for transferring said data and said microinstructions therebetween; and address leads interconnecting said central processing unit, said random access memory and said readonly memory for transferring addresses therebetween.

16. Apparatus in accordance with claim 15 wherein said central processing unit comprises:
   a microinstruction decoder for decoding said microinstructions;
   an adder and an accumulator for performing logic operations;
   a first register for creating and storing addresses for said random access memory;
   second, third and fourth registers for creating and storing addresses for said read-only memory; and
   multiplexed receivers and drivers for interfacing with said data-instruction leads and said address leads.

17. Apparatus in accordance with claim 15 wherein said first part of said means for establishing a communications link comprises a dial pulse relay and contacts operable by said relay for generating dial pulses to establish said link, said central processing unit providing said outputs to operate said relay.

18. Apparatus in accordance with claim 15 wherein said read-only memory comprises:
   a memory means for storing eight-bit microinstructions;
   an address decoder for decoding said addresses from said address leads; and
   drivers for interfacing said data on said data-instruction leads.

19. Apparatus in accordance with claim 15 wherein said random access memory comprises:
   a memory means for storing four-bit words;
   decoder means for decoding said addresses from said address leads; and
   interface means for interfacing said data on said data-instruction leads.

20. Apparatus in accordance with claim 15 wherein said general purpose input-output unit comprises:
   receivers for interfacing said data from said keyboard and said data on said data-instruction leads;
   drivers for applying said outputs to said second part of said means for establishing a communications link and said decoder; and
   an instruction decoder for decoding instructions received on said data-instruction leads.

21. Apparatus in accordance with claim 15 wherein said second part of said means for establishing said communications link comprises a multifrequency oscillator and said input-output unit provides said outputs for controlling said oscillator.

22. Apparatus in accordance with claim 21 wherein said outputs for controlling said oscillator are encoded in a two-out-of-eight code, and said terminal apparatus further includes analog switch means for selecting respective said outputs for application to said multifrequency oscillator.

23. Apparatus in accordance with claim 1 wherein said means receiving said second response comprises a telephone having a transmitter, receiver and dial, whereby said telephone can communicate with said central data base.

24. Apparatus in accordance with claim 1 including a transformer coupling connecting said terminal apparatus to said communication link, said coupling comprising a transformer, capacitor means for blocking direct current from said link through said transformers, and contact means operable to bypass said capacitor means.

25. Apparatus in accordance with claim 1 including means for isolating said means receiving said second response from said detector means while said first response is being detected by said detector means.

26. Apparatus in accordance with claim 25 wherein said means for isolating comprises a muting relay responsive to a respective one of said outputs, and contacts operable by said muting relay for disconnecting said means receiving said second response from said detector means.

27. Apparatus in accordance with claim 1 wherein said detector means detects a third one of said responses and provides a third signal representative of said third response to said microprocessor, said microprocessor being responsive to said third signal to prevent said data from being applied to said link.

28. Apparatus in accordance with claim 1 including an auxiliary keyboard connected in parallel with said keyboard.

29. Apparatus in accordance with claim 1 wherein said means for establishing said communications link comprises dial pulse signaling means and multifrequency signaling means, and said terminal apparatus further includes selector means for selecting said dial pulse signaling means or said multifrequency signaling means.

30. Apparatus in accordance with claim 1 including clock means providing clock signals to said microprocessor for controlling said microprocessor.

* * * * *